Nov. 5, 1968  J. M. STRANG  3,409,371
PERISCOPE HAVING MEANS TO ADJUST THE REMOTE
OPTICAL ELEMENT IN STEPS
Filed June 19, 1957  7 Sheets-Sheet 4
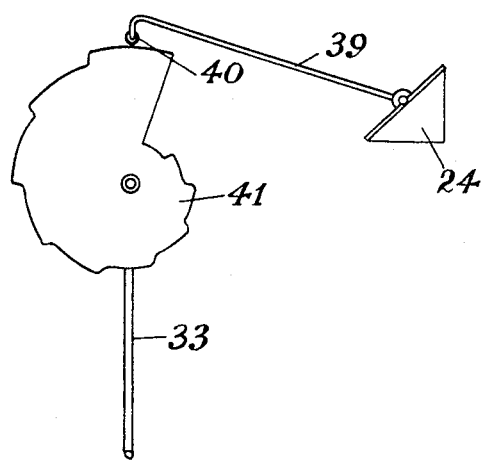
FIG: 4.
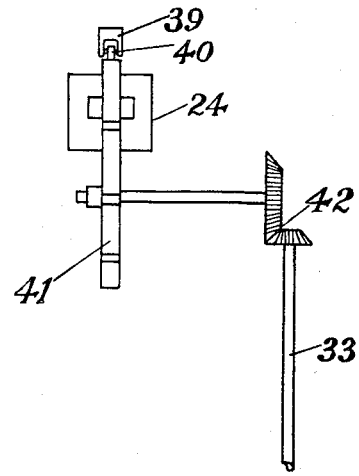
FIG: 4ª.
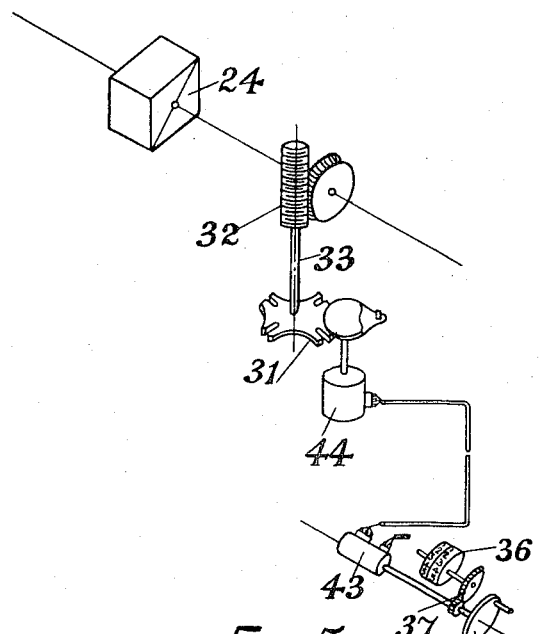
FIG: 5.
Inventor:
John Martin Strang
By Cushman, Darby & Cushman
attys Nov. 5, 1968  J. M. STRANG  3,409,371
PERISCOPE HAVING MEANS TO ADJUST THE REMOTE
OPTICAL ELEMENT IN STEPS
Filed June 19, 1957  7 Sheets-Sheet 5
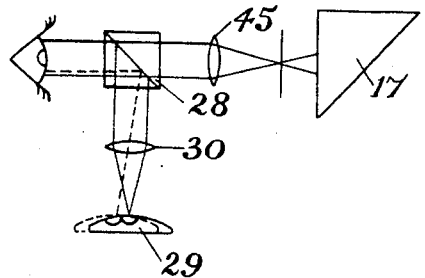
FIG: 6.
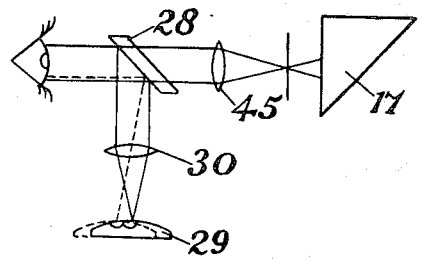
FIG: 7.
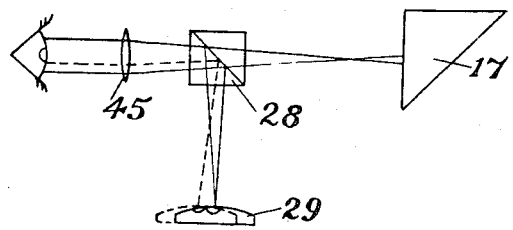
FIG: 8.
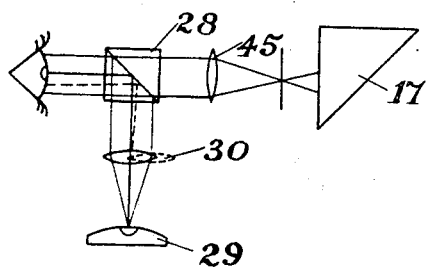
FIG: 9.
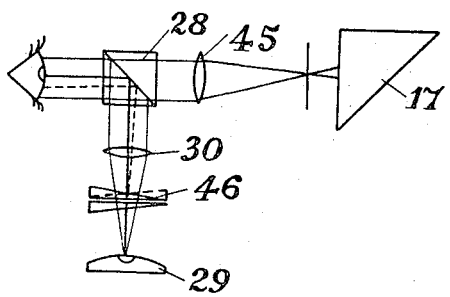
FIG: 10.
Inventor
John Martin Strang
By Cushman, Darby & Cushman
Atty Nov. 5, 1968

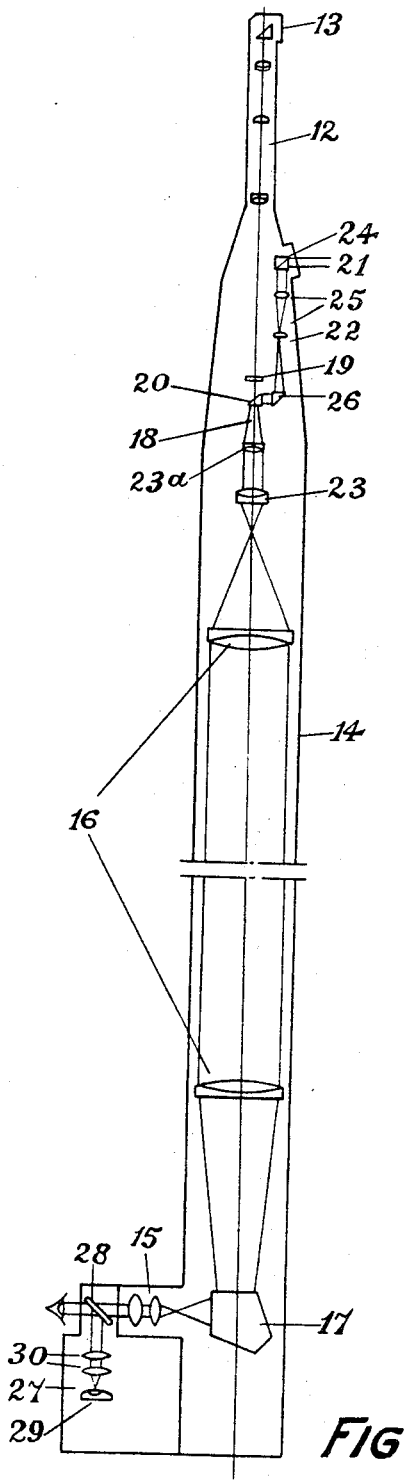
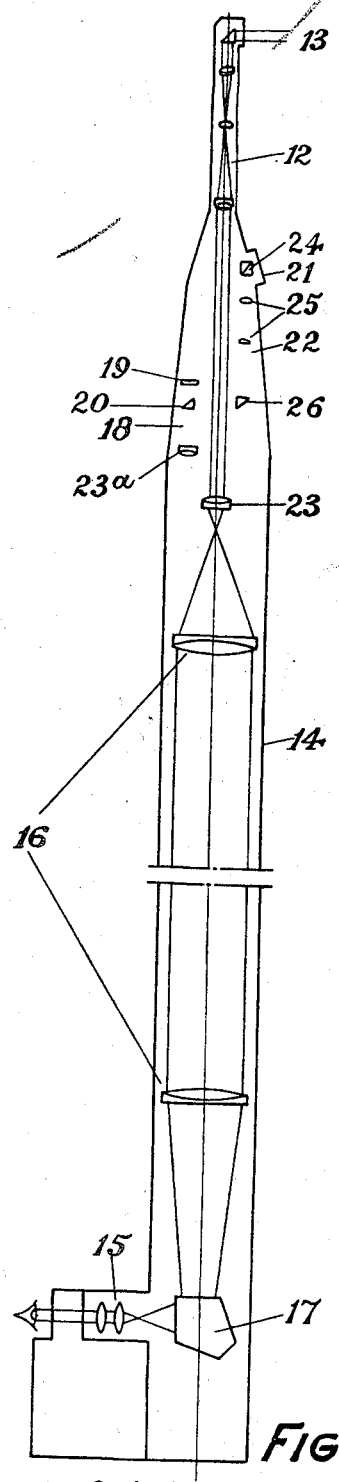
FIG: 2.   FIG: 1.

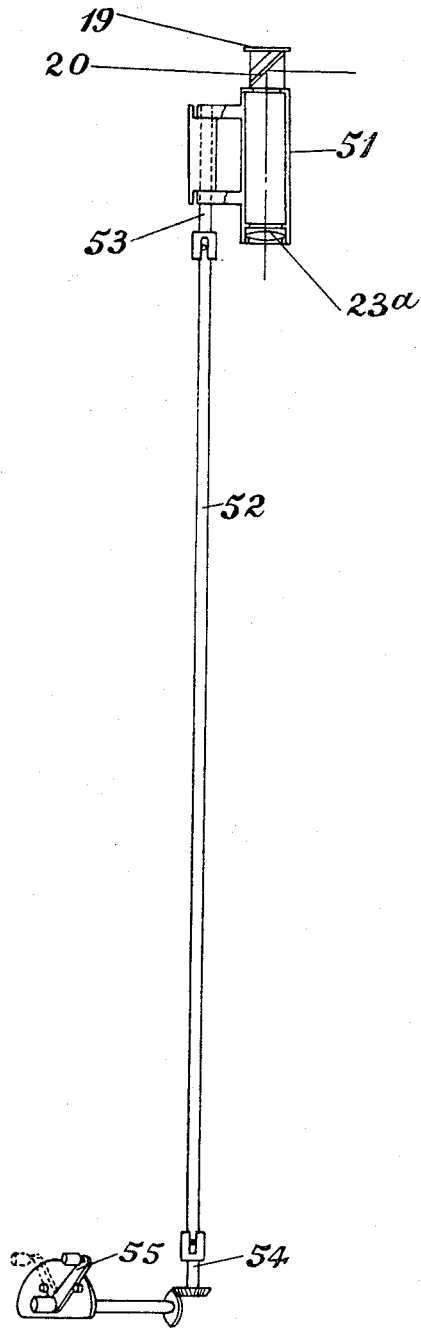
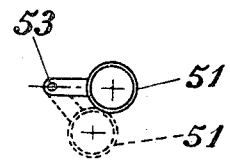

J. M. STRANG 3,409,371

PERISCOPE HAVING MEANS TO ADJUST THE REMOTE
OPTICAL ELEMENT IN STEPS

Filed June 19, 1957

Inventor
JOHN MARTIN STRANG

By
Cushman, Darby & Cushman
Attorneys

3,409,371
PERISCOPE HAVING MEANS TO ADJUST THE REMOTE OPTICAL ELEMENT IN STEPS
John Martin Strang, Anniesland, Glasgow, Scotland, assignor to Barr and Stroud Limited, Anniesland, Glasgow, Scotland
Continuation-in-part of application Ser. No. 368,549, July 17, 1953. This application June 19, 1957, Ser. No. 667,063
Claims priority, application Great Britain, June 28, 1956, 20,108/56
17 Claims. (Cl. 356—72)

This application is a continuation-in-part of application S.N. 368,549 filed July 17, 1953, now abandoned.

This invention relates to periscopes, especially to submarine periscopes, and one of the chief objects is to facilitate accurate measurement of the elevation of distant objects such as stars for navigational purposes through such periscopes, thereby providing a combined periscope-sextant. The invention is particularly suitable for periscopes of relatively great length wherein inaccuracies due to backlash are liable to occur in long mechanical transmission mechanisms.

The invention is a periscope having means for measuring the angle between a distant object and a datum adjacent the observer at the lower part of the periscope, comprising a remote optical element at the upper part of the periscope adapted to receive a beam of light from the distant object, means for coarse mechanical adjustment in precise steps of said element whereby the image of the distant object is brought into the observer's field of view into association with said datum or its image, and means adjacent the observer for effecting fine relative adjustment between said datum or its image and the image of the distant object, within said steps, by moving said datum or an optical component adjacent the observer, and adapted to influence the positional relationship between the image of the distant object and said datum or its image. A measurement of the two adjustments at the observer provides an accurate measure of the angle between the distant object and the datum.

The datum may be an artificial horizon such as a bubble in liquid, and the fine relative adjustment may conveniently be obtained by moving said datum and hence its image relatively to the field of view.

Means may be provided to measure any error in the reading at the datum mark arising from bend in the periscope tube between the remote optical element and the datum, and means may be provided to apply a compensating adjustment between the datum and the means for fine relative adjustment.

The invention further is a periscope having means for measuring the angle between a distant object and a base, comprising remote optical means at the upper part of the periscope adapted to receive a beam of light from the distant object, means for coarse mechanical adjustment in precise steps of said optical means whereby the image of the distant object is brought into the observer's field of view, and means adjacent the observer for effecting, within said steps, fine relative adjustment between the image of the distant object as viewed by the observer and a datum. The datum may be the image of the horizon as seen in the observer's field of view.

The present invention further is a periscope having means for measuring the angle between a distant object and a distant base (for example the horizon), comprising first and second remote optical means at the upper part of the periscope adapted to receive a beam of light from said object and a beam of light from said base, respectively, means for coarse mechanical adjustment in precise steps of said first optical means whereby the image of said object is brought into the observer's field of view into association with the image of said base, and means adjacent the observer for effecting fine relative adjustment between the image of said base and the image of said object, within said steps, by moving an optical component adjacent the observer, and adapted to influence the positional relationship between the image of said object and the image of said base.

Preferably the periscope includes in addition to the normally used viewing window and optical system, a secondary or sextant viewing window, a secondary telescope system for viewing through said sextant window, and movable optical means for either interrupting the light passing from the normal window and for leading the light from the secondary window to the field of view instead, or for interrupting the light passing from the sextant window and instead leading the light from the normal window to the field of view.

Said coarse mechanical adjustment may conveniently comprise a Maltese cross mechanism, driving the remote optical element through a worm gear, for example.

Embodiments of the invention will now be described, by way of example, as applied to a submarine periscope with sextant, with reference to the accompanying drawings wherein:

FIG. 1 is a diagrammatic view of a combined periscope-sextant but adapted for use merely as a periscope;

FIG. 2 is a diagrammatic view of the periscope sextant as shown in FIG. 1 but adapted for use as a sextant for sighting elevation of stars;

FIG. 2a is an elevation of a detail shown in FIGS. 1 and 2;

FIG. 2b is a plan view of the upper part of FIG. 2a;

FIGS. 4 and 4a are views at right angles to one another of a modified arrangement for effecting the coarse adjustment;

FIG. 5 shows a further modification for effecting the coarse adjustment;

Figure 11:
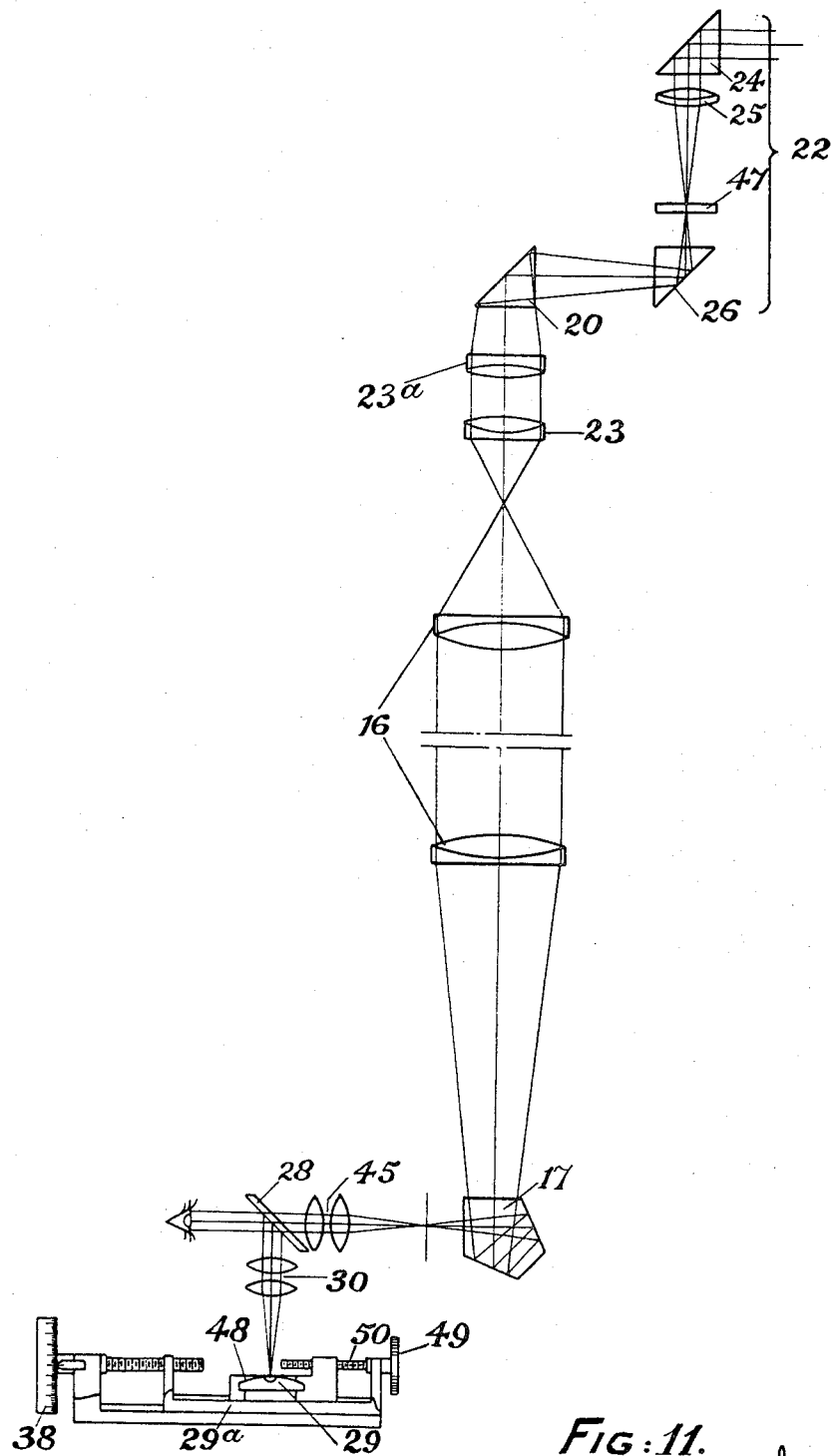
Figure 13:
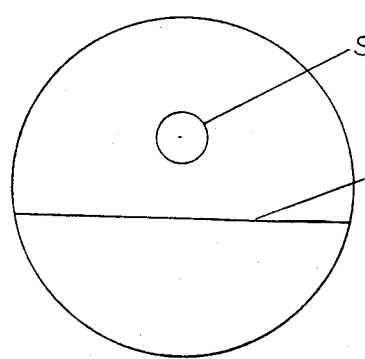
Figure 12:
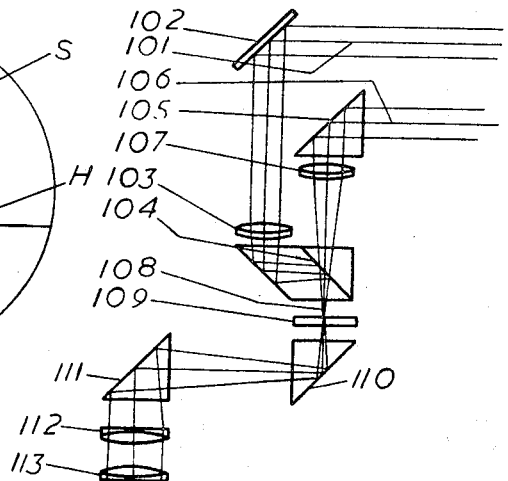
Figure 14:
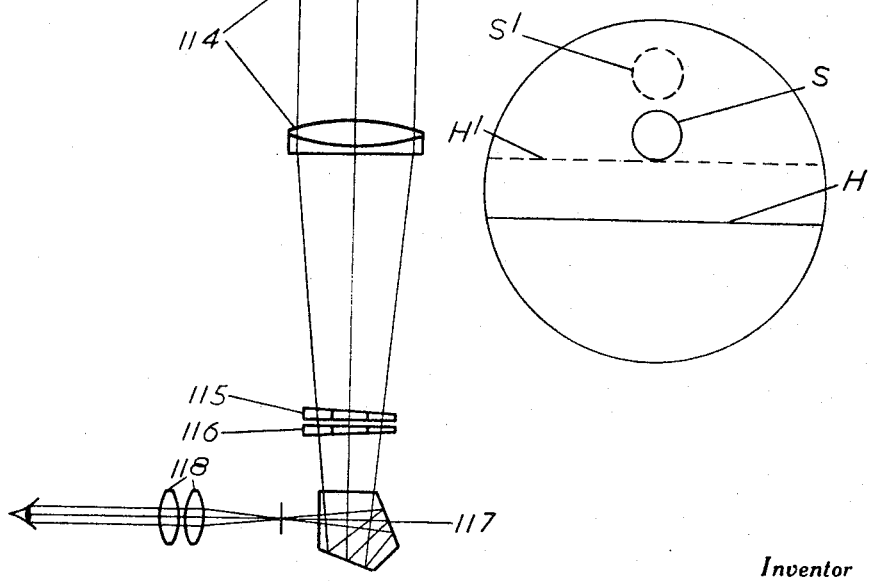

FIGS. 6, 7, 8, 9 and 10 each show details of modifications in the arrangement for effecting the fine adjustment;

FIG. 11 shows details of means for measuring and compensating for errors that may appear in the sextant reading due to a bend in the periscope tube between the remote optical element and the datum mark;

FIG. 12 is a diagrammatic view of a combined periscope sextant adapted for use as a sextant for sighting elevations of the sun; and FIGS. 13 and 14 are representations of what is seen by the observer, in the eyepiece of the periscope sextant of FIG. 12.

In the various figures the same reference numerals indicate like parts.

Referring to FIGS. 1 and 2, the periscope is of considerable length and comprises an uppermost section 12 with a viewing window 13, an intermediate section 14, and a lower eyepiece assembly 15, the periscope as a whole being rotatable about bearings in the submarine.

The uppermost section 12 is provided with the usual optical elements as shown diagrammatically and the light is transmitted therefrom to the eyepiece assembly 15 through a parallel beam lens system 16 and a pentagonal prism 17.

When the FIG. 1 construction is to be used as a sextant, the optical assembly indicated generally at 18 is swung into the axis of the light beam as shown in FIG. 2. This assembly comprises a part 19 adapted to cut off the light coming from the window 13, right angled prism 20 which transmits the image received from the sextant sighting window 21 through the system 22, and projector lens 23a; the image is transmitted through focussing lens 23 towards the lens system 16 and into the field of view of the observer near the bottom of the periscope.

As shown in FIGS. 2a and 2b the elements 19, 20 and 23a of assembly 18 are mounted on a carrier 51 which can be pivoted about the longitudinal axis of rod 52 positioned between end mountings 53, 54. Thus the optical assembly 18 can be swung by remote control between the operative and inoperative positions as shown in full and dotted lines in FIG. 2b, by movement of a control lever 55 near the bottom of the periscope.

The sextant optical system 22 includes a prism 24 remote from the observer and which is turnable about an axis disposed at right angles to the longitudinal axis of the periscope and to the light beam from the distant object received through the window 21. It also includes lenses 25, and a right angled prism 26, said lenses 25 projecting the light forming the image from the turnable sighting prism 24 into the right angled prism 26 and thence to the prism 20.

When used as a sextant, a sextant unit 27 including the datum mark is brought into operative position at the eyepiece assembly 15.

This sextant unit 27 contains a reflecting-transmitting member or prism 28 which is adapted to be located in front of the viewing aperture in the eyepiece assembly 15 at an angle of 45° thereto. A spirit-bubble and holder 29 therefor are located below prism 28, and an image of the bubble is projected up through lenses 30 onto the lower surface of prism 28 and reflected into the field of view. The image of the distant object is transmitted to the observer through prism 28.

The image of the bubble is projected onto the prism 28 by illuminating means which may comprise an electric lamp having a rheostat in the electric circuit thereof, whereby the intensity of illumination of the bubble-image in the field of view may be made to match that of the image of the distant object.

In order to measure the elevation of, for example, a star, the ideal procedure would be for the observer to turn the sighting prism 24 by means of a remote control assembly, until the image of the star, as seen through prism 28, coincides with the image of the bubble, the operating control handle having previously been calibrated in angles of elevation relative to the bubble as a datum. However, errors would be introduced due to backlash in the gearing of the remote control, such errors may increase the longer the periscope is.

Figure 3:
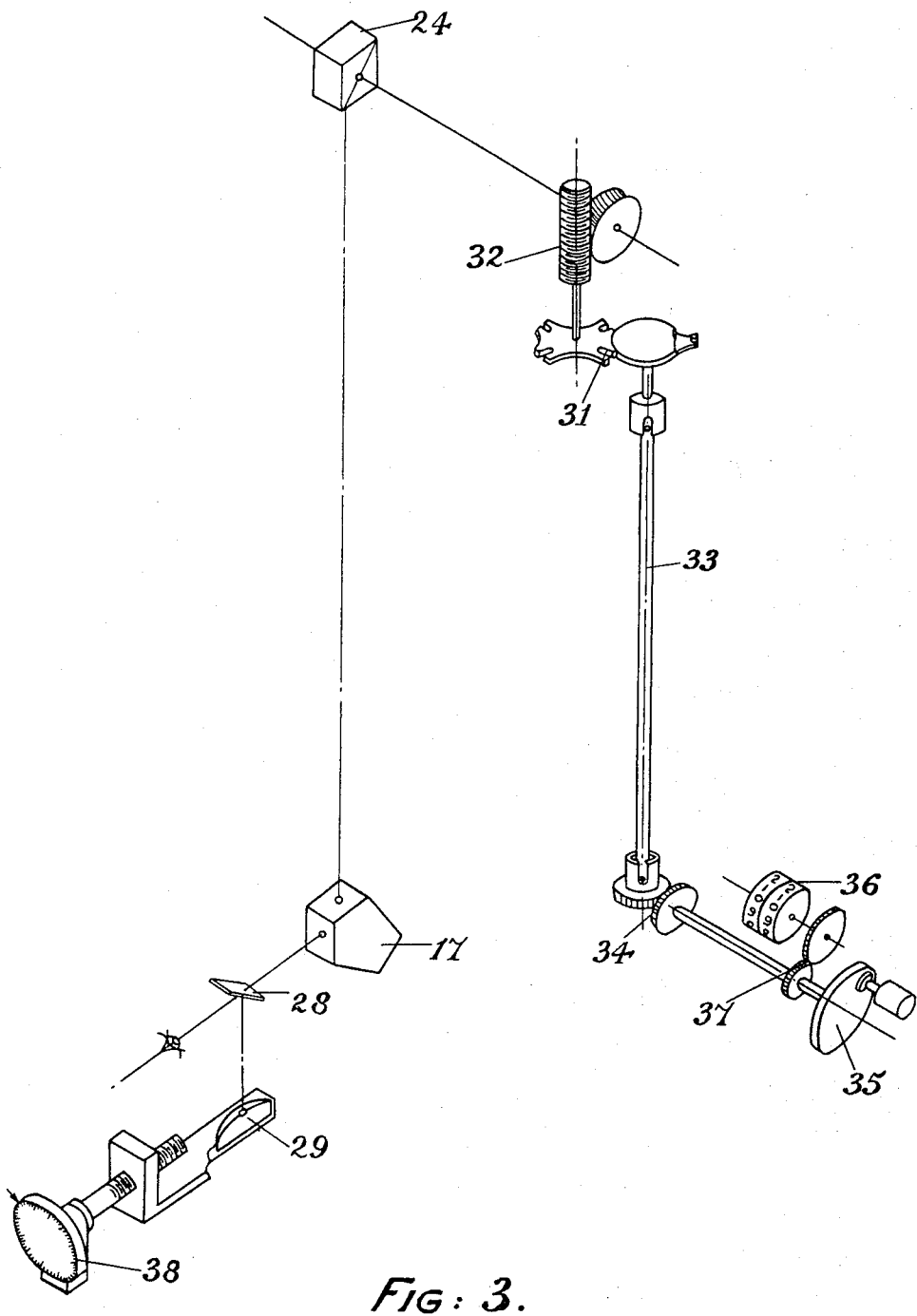
FIG. 3 is a diagrammatic representation of one arrangement for effecting the coarse and fine adjustments for measuring angles with a periscope sextant as shown in FIG. 2.

To overcome this disadvantage an arrangement as shown in FIG. 3 may be used. The turnable prism 24 is movable in steps by a coarse mechanical adjustment comprising a Maltese cross mechanism 31 driving the prism 24 through a worm gear 32, shafting 33, bevel gearing 34 and control head 35. Indicating drums 36 are provided driven from the head 35 through gearing 37. Thus one moves the control head 35 and the Maltese cross 31, hence moving the prism 24 in steps until the image of the distant object whose elevation or angle is to be measured is in the field of view.

By designing the steps of the Maltese cross of a correct order, the image of the star to be sighted may be brought into the field of view of the prism 28 in the neighborhood of the image of the bubble or datum. The drums 36 indicate the number of steps passed through by the Maltese cross 31. If these steps each give, through the worm gear 32, an angular movement of 1° (or a predetermined fraction or multiple thereof) to the prism 24, then the drums 36 may be calibrated in degrees of elevation as moved through by the prism 24; the drum reading is subject to backlash at 34, 37, but nevertheless gives a precise reading of the number of steps through which the prism has been moved. The backlash at 34, 37 must not be large enough to allow any doubt as to the step at which prism 24 is set.

This is not of course sufficient for the final measurement, and in order to determine the exact angle between the star and the datum a fine adjustment control head 38 is provided by means of which the bubble and hence its image may be moved relative to the prism 28 to coincide with the image of the star. That is to say, means are provided at the observer for moving the datum relative to the image of the star. The movement of the bubble need not be more than that corresponding to one of said steps.

Thus if the drums 36 are calibrated in degrees, the control head 38 would be calibrated in minutes. By taking readings from the drums 36, and the control head 38, after the image of the bubble has been adjusted exactly into coincidence with that of the star in the field of view, accurate measurement of the elevation of the star may be obtained by algebraic summation of the readings.

As shown in FIGS. 4 and 4a, in place of the Maltese cross and worm gear arrangement, the turnable prism 24 may have a lever or rod 39 rigidly connected thereto, the end of the rod remote from the prism having a downwardly-bent portion terminating in a small wheel or follower 40 which contacts the outer peripheral surface of a cam 41 of stepped profile driven from the shaft 33 through a bevel and pinion gear assembly 42.

The outer periphery of the cam wheel 41 is formed with a series of concentric steps or arcuate portions of diminishing radii. Thus as the cam 41 is turned, the lever 39 moves away from the axis of said cam in positive steps. The cam 41 as shown in FIG. 4 will always be turned in an anticlockwise direction.

As shown in FIG. 5, the shaft 33 and bevel gearing 34 may be replaced by electrical remote follow-up mechanism or servo-mechanism, for example, a Desynn or similar transmitter 43 adjacent the observer and a complementary receiver 44 remote from the observer. The Maltese cross drive 31 may likewise be replaced in this case by the stepped cam drive.

FIG. 6 shows the path of the light beam forming the bubble-image when the holder 29 carrying the bubble is moved by the control head 38 (FIG. 3). An eye-lens 45 is located between the prisms 17 and 28.

In FIG. 7, the reflecting-transmitting prism 28 is parallel-sided.

In FIG. 8, the eye-lens 45 is located on the side of the prism 28 adjacent the observer.

In FIG. 9, instead of moving the holder 29 carrying the bubble by means of the fine control head 38, a lens 30 may be mechanically coupled to the latter, being movable thereby to vary the position of the bubble-image or datum in the field of view.

Again, the position of the image of the bubble may be varied relative to the image of the distant object by interposing a deviating prism 46 between the bubble holder 29 and the lens 30. The position of the bubble-image in the field of view is varied by turning the prism 46, as indicated in dotted lines, by means of the control head 38.

Errors may be introduced under working conditions into the readings of angle or elevation, due to bending of the periscope tube, for example by one side becoming hotter than the other, by strain in the bearings, or by the thrust arising from movement of the tube through the water.

To compensate for this, as shown in FIG. 11 a graticule 47 is placed in the light beam in the uppermost section 12 of the periscope, while a second graticule 48 is provided on the bubble holder 29. A control handle 49 is provided for screw adjustment 50 by means of which the graticule 48 and bubble-holder 29 attached thereto may be moved relative to the bubble guide 29a. That is to say the datum may be moved relative to the control head 38 as hereinafter described to correct for bend in the periscope tube by aligning the graticules 47 and 48.

In a modification, the fine control head 38 may be adapted to move, for example, the prism 17, or lens 45, that is, to move the image of the star in the field of view relative to that of the bubble.

During use of the instrument as a periscope, the optical system 18 is swung out of the incoming light beam from the viewing window 13, as shown in FIG. 1, and the sextant unit 27 is moved out of operative position.

If the device for compensating for bend in the periscope tube is incorporated in the instrument, the control handle 49 (FIG. 11) is firstly turned, with the control head 38 in its zero reading position, until the images of the graticules 47 and 48 coincide in the field of view. Control head 35 and control head 38 are then operated as before.

Referring now to FIGS. 12, 13 and 14, when the periscope sextant is used as a sextant, a beam of light 101 from the horizon is received at fixed mirror 102 at the upper or remote end of the periscope and is reflected through condenser lens system 103 to a beam splitter 104. A reflecting prism 105 rotatable on a horizontal axis receives a beam of light 106 from the sun and this beam is reflected through condenser lens system 107 to the beam splitter 104. The beam splitter 104 combines the light from the horizon with the light from the sun.

The combined beam of light 108 passes through graticule 109 positioned in the focal plane, to right-angled prism 110, and thence to right-angled prism 111. Prism 111 transmits the light through projector lens 112 and focussing lens 113 towards a parallel-beam lens system 114. From lens system 114 the light passes through prisms 115 and 116 (hereinafter described) to a pentagonal prism 117. The light is reflected from prism 117 through eye lenses 118 to the observer.

In use, the prism 105 is rotated in a series of precise steps by, for instance, a Maltese cross mechanism as hereinbefore described. The sun and horizon images can thus be brought within the field of view in the periscope eyepiece. Fine sub-division of this coarse adjustment is effected by means of the prisms 115 and 116 which are oppositely rotatable in their own plane, and which are deviating as shown.

Prisms 115 and 116 are both formed with a central and circular through aperture. Thus some of the light from the lens system 114 passes through the prisms and some passes through the apertures. The light passing through the prisms is deviated according to the angular position of the prisms, the light passing through the apertures being, of course, unaffected. Thus the "ghost" image of the horizon formed by the light passing through the prisms 115 and 116 can be moved till it coincides with the image of the sun formed by the light passing through the apertures.

The two prisms 115 and 116 are rotatable by a mechanism adjacent the observer, to which will be attached the scale of fine sub-divisions.

FIG. 13 shows what is seen by the observer when the coarse adjustment has been applied. The primary image S of the sun and the primary image H of the horizon are both within the observer's field of view. FIG. 14 shows what is seen when the fine adjustment has been applied. The adjustment is complete when the deviated or "ghost" image of the horizon $H^1$ just touches the sun image S. The "ghost" image of the sun is denoted by $S^1$.

Thus, the angle between a base such as the horizon, and a distant object such as the sun, can be measured by aligning a datum which is the image of said base, and the image of said distant object; the angle is given by a measurement of the coarse and fine adjustments at the observer.

I claim:

1. A periscope having, in addition to the normally used viewing window and optical system, a secondary or sextant viewing window, a secondary telescope system for viewing through said sextant window, and movable optical means for either interrupting the light passing from the normal window and for leading the light from the secondary window to the field of view instead, or for interrupting the light passing from the sextant window and instead leading the light from the normal window to the field of view, and having means for measuring the angle between a distant object and a datum adjacent the observer at the lower part of the periscope, comprising a remote optical element at the upper part of the periscope adapted to receive a beam of light through said secondary window from the distant object, means for coarse mechanical adjustment in precise steps of said element whereby the image of the distant object is brought into the observer's field of view into association with the datum mark or its image, and means adjacent the observer for effecting fine relative adjustment between the datum or its image and the image of the distant object, within said steps, by moving said datum or an optical component adjacent the observer, and adapted to influence the positional relationship between the image of the distant object and said datum or its image.

2. A periscope as claimed in claim 1, in which said movable optical means comprises an assembly of light interrupting means, light ray bending or reflecting means and lens means, said periscope also comprising a carrier for said assembly, and means operable by remote control to displace said carrier into or out of the path of the light from the normal window of the periscope to the field of view.

3. A periscope having means for measuring the angle between a distant object and a datum adjacent the observer at the lower part of the periscope, comprising a remote optical element at the upper part of the periscope adapted to receive a beam of light from the distant object, means for coarse mechanical adjustment in precise steps of said element whereby the image of the distant object is brought into the observer's field of view into association with the datum mark or its image, a first graticule fixed in the neighborhood of the remote optical element and located in the light beam therefrom and a second graticule adjacent the observer and movable to align the image of the second graticule in the field of view with that of the first graticule, in order to measure the amount of bend in the periscope tube between the remote optical element and the datum mark, and means adjacent the observer for effecting fine relative adjustment between the datum mark or its image and the image of the distant object, within said steps, by moving said datum or an optical component adjacent the observer, and adapted to influence the positional relationship between the image of the distant object and said datum mark or its image.

4. A periscope as claimed in claim 3, in which the second graticule is fixedly attached to the datum mark, and comprising means for applying a corrective adjustment between the datum mark and the means for fine relative adjustment, in order to compensate their relative positions for bend in the periscope tube between the remote element and the datum mark.

5. A periscope having means for measuring the angle between a distant object and a datum adjacent the observer at the lower part of the periscope, comprising a remote optical element at the upper part of the periscope adapted to receive a beam of light from the distant object, a Maltese cross mechanism and worm gear for coarse mechanical adjustment, in precise steps, of said element whereby the image of the distant object is brought into the observer's field of view into association with the datum mark which comprises a bubble in a carrier, and means adjacent the observer for effecting fine relative adjustment between the datum mark and the image of the distant object, within said steps, by moving said datum mark, and adapted to influence the positional relationship between the image of the distant object and said datum mark.

6. A periscope having means for measuring the angle between a distant object and a datum, comprising a remote optical element pivotally mounted at the upper part of the periscope adapted to receive a beam of light from a distant object, means for coarse mechanical adjustment of said remote optical element in precise steps, a datum at the lower part of the periscope, optical means at the lower part of the periscope for viewing the image of said distant object in association with the image of said datum, and means operatively associated with said optical means for viewing for effecting fine adjustment between the image of said distant object and the image of said datum.

7. A periscope as claimed in claim 6, in which said coarse mechanical adjusting means comprises a Maltese cross mechanism.

8. A periscope as claimed in claim 7, in which the Maltese cross mechanism drives tthe remote optical element through a worm gear.

9. A periscope as claimed in claim 6, in which said coarse mechanical adjusting means comprises driven lever means connected to the remote optical element, and a driving cam of stepped profile adapted to actuate said lever means.

10. A periscope as claimed in claim 6, in which the datum comprises a bubble in a carrier.

11. A periscope as claimed in claim 6, in which said coarse mechanical adjustment includes an electric remote follow-up mechanism comprising a mechanically actuated electrical transmitter at the lower part of the periscope, and a remote receiver mechanically driving the remote optical element.

12. A periscope having means for measuring the angle between a distant object and a base reference, comprising a remote optical element pivotally mounted at the upper part of the periscope and adapted to receive a beam of light from a distant object, means for coarse mechanical adjustment of said remote optical element in precise steps, optical means at the lower part of the periscope for viewing the image of said distant object, and means operatively associated with said optical means for viewing for effecting fine adjustment of the image of said distant object.

13. A periscope according to claim 12, in which said fine adjustment means includes a pair of apertured rotatable prisms.

14. A periscope according to claim 12, in which the remote optical element is a reflecting prism.

15. A periscope having means for measuring the angle between a distant object and a base object, comprising a first remote optical element pivotally mounted at the upper part of the periscope and adapted to receive a beam of light from said distant object, a second remote optical element at the upper part of the periscope adapted to receive a beam of light from said base object, means for coarse mechanical adjustment of said first remote optical element in precise steps, optical means at the lower part of the periscope for viewing the image of said distant object in association with the image of said base object, and means operatively associated with said optical means for viewing for effecting fine adjustment between the image of said distant object and the image of said base object.

16. A periscope according to claim 15, in which said fine adjustment means includes a pair of apertured rotatable prisms.

17. A periscope according to claim 15, in which said first remote optical element is a reflecting prism.

References Cited

UNITED STATES PATENTS

| | | | |
|---|---|---|---|
| 2,266,741 | 12/1941 | Crane | 88—2.2 |
| 2,389,142 | 11/1945 | Esval | 88—2.2 |
| 2,412,940 | 12/1946 | Avery | 88—1 |
| 2,488,239 | 11/1949 | Rattray | 88—72 |
| 2,489,487 | 11/1949 | Gradisar | 88—39 |
| 2,579,903 | 12/1951 | Carbonara | 88—2.7 |
| 2,662,444 | 12/1953 | Gradisar | 88—39 |
| 2,360,822 | 10/1944 | Altman | 88—2 |
| 2,147,615 | 2/1939 | Baroni | 88—72 |

OTHER REFERENCES

"What You Should Know About Bausch and Lomb Bubble Sextant," Publication Bausch and Lomb, Feb. 8, 1949, pp. 8, 9, 23 and 33.

JEWELL H. PEDERSEN, *Primary Examiner.*

O. B. CHEW, *Assistant Examiner.*